US007693069B2

(12) United States Patent
Hao et al.

(10) Patent No.: US 7,693,069 B2
(45) Date of Patent: Apr. 6, 2010

(54) METHOD, APPARATUS AND SYSTEM FOR IMPROVED INTER-DOMAIN ROUTING CONVERGENCE

(75) Inventors: Fang Hao, Matawan, NJ (US); Sanjay Kamat, Marlboro, NJ (US); Pramod V. N. Koppol, Aberdeen, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1148 days.

(21) Appl. No.: 10/629,375

(22) Filed: Jul. 28, 2003

(65) Prior Publication Data

US 2005/0025118 A1 Feb. 3, 2005

(51) Int. Cl.
*G01R 31/08* (2006.01)
(52) U.S. Cl. ...................... 370/237; 370/248
(58) Field of Classification Search ................. None
See application file for complete search history.

(56) References Cited

U.S. PATENT DOCUMENTS 5,881,243 A * 3/1999 Zaumen et al. ............. 709/241
6,567,380 B1 * 5/2003 Chen ......................... 370/238
6,757,278 B1 * 6/2004 Bi et al. ..................... 370/356

OTHER PUBLICATIONS

Y. Rekhter et al., RFC 1771 entitled A Border Gateway Protocol 4 (BGP-4), Published by Internet Working Group, Mar. 1995, pp. 1-57.*

* cited by examiner

*Primary Examiner*—Robert W Wilson
(74) *Attorney, Agent, or Firm*—Wall & Tong, LLP

(57) ABSTRACT

A method and apparatus for improved inter-domain routing convergence, include transmitting reason information associated with a route update or withdraw. An apparatus receiving the reason information associated with the update or withdraw uses the reason information to determine which of its candidate routes are also affected by substantially the same event that triggered the initial route update or withdraw and which of its candidate routes are not affected. For example, a candidate route may be considered to be transient if the apparatus receiving the reason information determines from the received reason information that a candidate route is going to be updated or withdrawn in the near future due. A candidate route considered as a transient route is avoided being advertised as a preferred route.

23 Claims, 4 Drawing Sheets

METHOD, APPARATUS AND SYSTEM FOR IMPROVED INTER-DOMAIN ROUTING CONVERGENCE

FIELD OF THE INVENTION

This invention relates to internet networks and, more specifically, to inter-domain routing in internet networks.

BACKGROUND OF THE INVENTION

A computer network is a geographically distributed collection of interconnected communication links for transporting data between nodes, such as computers. Many types of computer networks are available, with the types ranging from Local Area Networks (LANs) to Wide Area Networks (WANs). The nodes typically communicate by exchanging discrete frames or packets of data according to pre-defined protocols.

Computer networks may be further interconnected by an intermediate node, known as a router, to extend the effective "size" of each network. Since management of a large system of interconnected computer networks can prove burdensome, smaller groups of computer networks may be maintained as autonomous systems (AS) or routing domains. The networks within a routing domain are typically coupled together by conventional "intradomain" routers. Yet it still may be desirable to increase the number of nodes capable of exchanging data. In this case, "inter-domain" routers executing inter-domain routing protocols are used to interconnect nodes of the various AS.

An example of an inter-domain routing protocol is the Border Gateway Protocol (BGP), which performs routing between AS by exchanging routing and reachability information among inter-domain routers of a network. Specifically, each BGP router maintains a routing table that lists all feasible paths to a particular network. Periodic refreshing of the routing table is generally not performed however, BGP peer routers residing in the autonomous systems exchange routing information under certain circumstances. For example, when a BGP router initially connects to the network, the peer routers exchange the entire contents of their routing tables. Each BGP speaker learns from its peers a set of routes for a prefix, with each of its peers contributing at most one route to this set. Each route has a set of attributes associated with it. The selection of the most preferred route to a destination (address prefix) often involves comparing these attributes.

BGP4 is the de facto standard for inter-domain routing in the Internet. However, BGP4 and other BGP protocols have been shown to experience the problem of long convergence times that often occur when some events, such as topological changes, trigger routing updates. During these long convergence times, the speakers tend to incur more update messages than may be necessary for achieving convergence.

SUMMARY OF THE INVENTION

The invention comprises a method and apparatus for improved inter-domain routing convergence.

In one embodiment of the present invention, a method for improved inter-domain routing convergence includes transmitting reason information associated with a route update or withdraw. The reason information associated with a route update or withdraw may be transmitted within an update or withdraw message itself and includes reasons for the update or withdraw, including loss of peering or a change in a cost of a link or links of an initiating node pair. Additionally, the reason information associated with an update or withdraw is used to determine which of its candidate routes are also affected by substantially the same event that triggered the initial route update or withdraw and which of its candidate routes are not affected. A candidate route may be considered to be a transient route if it is determined from the received reason information that a candidate route is going to be updated or withdrawn in the near future. A candidate route considered as a transient route is avoided being advertised as a preferred route.

In another embodiment of the present invention, an apparatus includes a processor and a memory, and the apparatus is adapted to perform the step of transmitting reason information associated with a route update or withdraw to neighboring apparatuses. The apparatus may further be adapted to perform the steps of receiving reason information associated with a received update or withdraw, and using the received reason information to determine which of its candidate routes are also affected by substantially the same event that triggered the initial route update or withdraw and which of its candidate routes are not affected. A candidate route is considered by the apparatus to be a transient route if it is determined by the apparatus from the received reason information that a candidate route is going to be updated or withdrawn in the near future. A candidate route considered as a transient route is avoided being advertised as a preferred route by the apparatus to its neighbors.

In alternate embodiments of the present invention, version information is also transmitted along with an update or a withdraw. The version information is used to determine which candidate routes are to be considered transient. As before, a candidate route considered as a transient route is avoided being advertised as a preferred route.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Figure 1:
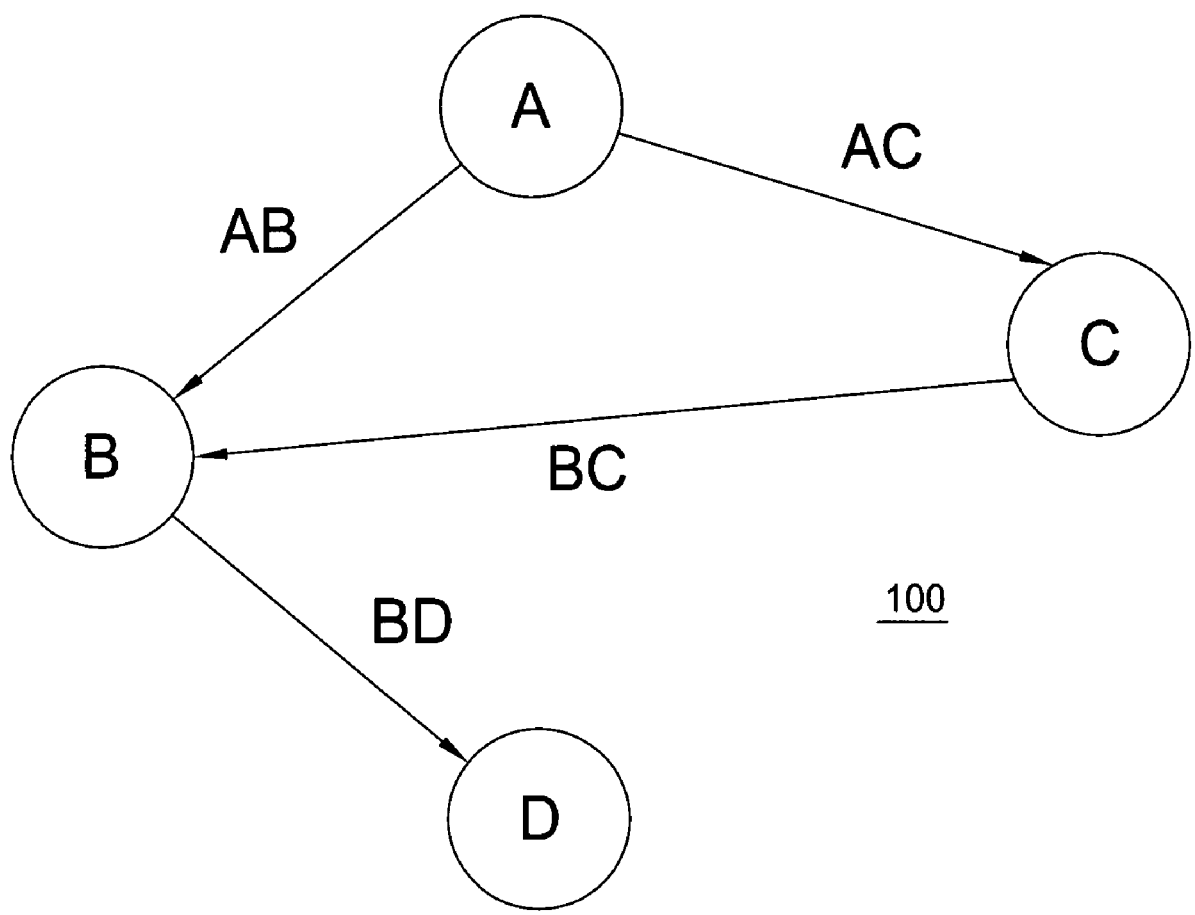
FIG. 1 depicts an exemplary topology of a plurality of nodes suitable for the implementation of an embodiment of reason propagation in accordance with the present invention.

The present invention advantageously provides a method and apparatus for improved inter-domain routing. Although the present invention will be described primarily within the context of a computer network comprising routers utilizing the Border Gateway Protocol (BGP) for inter-domain routing, it will be appreciated by those skilled in the relevant art, informed by the teachings of the present invention, that the principles of the present invention may be implemented in other types of networks having other network devices utilizing other routing protocols wherein it is desirable to decrease convergence times and message overhead associated with inter-domain routing.

The inventors present a method for improving BGP routing convergence time from the perspective of information available to BGP routers during the transient period of routing convergence. A main cause of delayed BGP routing convergence stems from insufficient information being available at BGP routers about the event that caused a routing change. Without this information, a router cannot distinguish between those candidate routes that are also affected by the same event that triggered the initial route update and those that are not affected. Consequently, a router may advertise a new route only to withdraw or update it in a short time interval. A cascading effect of such unnecessary updates leads to long convergence times. The inventors propose carrying minimal additional information in BGP route updates about the update triggering event to mitigate the problem.

As previously mentioned, BGP is essentially a policy routing protocol that uses path vector routing. Each BGP speaker learns from its peers a set of routes for a prefix with each of its peers contributing at most one route to this set. Each route has a set of attributes associated with it. The selection of the most preferred route to a destination (address prefix) often involves comparing these attributes. While the most preferred route may or may not be the shortest route depending on policies, the AS-PATH length attribute, which records the sequence of autonomous systems (AS) on the route to destination, plays a key role in route selection. It is observed that the most preferred path is usually the one with the smallest AS-PATH length. As such, artificially inflating AS-PATH lengths using path pre-pending is sometimes used to influence route selection in BGP.

BGP operates on a routing topology that is determined by the AS level interconnectivity of an internet and the routing policies pertaining to various prefixes at each of the autonomous systems. BGP's path vector routing approach provides each router with a certain level of visibility into the routing topology. The degree of the routing topology information that is visible to a router participating in a path vector routing protocol is intermediate between that provided by two other well-known routing protocol technologies—distance vector and link state. Distance vector protocols with almost no visibility into the underlying topology tend to have larger convergence times. Link state routing protocols are credited with faster convergence, but require flooding of topology information throughout the network. Large flooding overhead clearly makes link state routing unsuitable for a large internet inter-domain topology. Additionally, path vector routing facilitates decentralized implementation of routing policies, which is central to internet inter-domain routing. As such, it is desirable to improve the routing convergence of BGP within its path vector routing framework.

A Border Gateway Protocol (e.g., such as BGP version 4) actually consists of two protocols—external BGP (eBGP) that is used between a pair of routers across an AS boundary and internal BGP (iBGP) that is used by routers within an AS for providing transit service. This invention addresses the delayed convergence problem associated with eBGP.

An AS may contain several routers that run eBGP, each running a BGP session with a corresponding router (peer) in a neighboring AS. Once a BGP session is established, each of the two routers informs the other of a route to each of the destination prefixes that it wants the other to know. After this initial exchange, each router informs the other only of changes to the previously advertised routes. The initial and the subsequent exchange of routing information are achieved through the variable length UPDATE message. A BGP UPDATE message may contain a variable number of routes that are being withdrawn followed by a variable number of new routes that are being advertised. A route that is being withdrawn is simply identified by the destination prefix that is being advertised as unreachable via the advertising AS. A new route that is being advertised is identified by the destination prefix (included in the Network Layer Reachability Information (NLRI) field). All prefixes in the NLRI part of the message share the advertised set of path attribute values. Attributes play an important role in the definition of routing policies and in the route selection process.

BGP employs the AS-PATH attribute to implement its path vector routing mechanism. Each AS pre-pends its unique AS number to this attribute (one or more times) to build the path vector as the route advertisement propagates. Besides preventing loops, AS-PATH plays a key role in route selection. Typically, BGP routing defaults to selecting shortest paths based on the length of this attribute. The practice of using policies at AS to pad their AS number multiple times on certain links to artificially inflate AS-PATH length of specific routes and thereby indicate preference for some routes over others, is quite common in the Internet.

AS-PATH is an example of a mandatory, or well-known attribute (i.e., one that must be recognized by all BGP routers). ORIGIN, which indicates the source of route advertisement, Local Preference, which indicates preference for a border router within an AS, and Next Hop, which indicates where to forward data along the route are some of the other well-known attributes. In addition, there are also several optional attributes that may not be present in all BGP implementations. Optional attributes are further classified as transitive or non-transitive. The former may be passed by BGP speakers to their peers and so on, while the latter are not (i.e., non-transitive is only used locally). The BGP routing table is often referred to as the Routing Information Base or RIB. The BGP standard defines three kinds of RIBs; namely:

1. Adj-RIB-In is the set of routes learned from a particular neighbor. Only those routes that are acceptable according to locally configured policy (if any) are retained. There is one such RIB per neighbor.
2. Loc-RJB is the set of routes that are preferred at the conclusion of route selection process and will be locally used. The route selection process operates on the routes in the Adj-RIB-Ins, treating all the routes for a prefix as candidate routes and selects the most preferred route among them. There is only one such RIB per system.
3. Adj-RIB-Out is the set of routes to be advertised to a specific neighbor. Locally configured policy rules determine what routes may be advertised to specific neighbors. There is one such RIB per neighbor.

While the conceptual distinction between the three kinds of RIBs is useful to understand the process of route selection and propagation in BGP, the generic term RIB will be used herein to denote all of the routing information available at a router.

When an UPDATE message containing withdrawn routes is received, the previously advertised routes corresponding to the withdrawn destinations are removed from the Adj-RIB-In. This necessitates running the BGP route selection process since the previously advertised route is no longer available for use. When an UPDATE message contains a feasible route, then either it is a new route or a change to an existing route in the Adj-RIB-In. The latter amounts to an implicit withdraw of an existing route. In either case, the specific Adj-RIB-In is updated with the received route and the BGP route selection process is run. It should be noted that in various implementations multiple UPDATE messages are batched together before the BGP route selection process is performed.

FIG. 1 depicts an exemplary topology of a plurality of nodes suitable for the implementation of an embodiment of reason propagation in accordance with the present invention. The topology 100 of FIG. 1 comprises four nodes A, B, C and D connected by four links AB, AC, BC and BD. Illustratively, link AB connects nodes A and B, link AC connects nodes A and C, link BC connects nodes B and C, and link BD connects nodes B and D. FIG. 1 is essentially a directed graph used to represent the routing topology corresponding to a destination prefix. Each of the nodes A, B, C and D represents an AS. Each node also abstracts the routing information and policies to all the eBGP speakers of the AS. That is, each link represents a peering connection between two BGP routers of neighboring ASs. The weight associated with a directed link from node A to node B reflects the 'cost' advertised by B to A to carry traffic from A to the destination. Node B can change this cost through AS-PATH padding policy. Thus, sum of the link weights on a path at a node equals the AS path vector length for the corresponding route.

In the topology 100 of FIG. 1, node A has two routes to the same destination in node D, one each through its neighbors node B and node C. Typically, node A selects the shorter route through node B as the preferred route to node D. However, if a policy change increases the cost of the link between B and D from 1 to 5, which may be achieved by node D padding itself to AS-PATH to change the AS-PATH attribute from BD to BDDDDD, B will then send route updates to A and C, since its previously advertised route has changed. Subsequently, node C will also send an update to node A. When node A has received an update from node B but not from node C, node A has two candidate routes, the route via node B with the current AS-PATH ABDDDDD (cost=6) and the route via node C with the stale AS-PATH ACBD (cost=3). Based on this information, node A may switch to using node C instead of node B to route the traffic to node D. This change at node A will trigger route updates by node A to its neighbors. Clearly, this switch and subsequent updates triggered at A were unnecessary since a subsequent update from node C with AS-PATH attribute CBDDDDD bumps the cost of the route via node C to node D to a cost of 7 and will cause node A to switch back to using the route via node B.

Note that since AS-PATH padding policies are prefix and link specific, as far as the topology is concerned, all candidate routes at node A that use link BD will have their path lengths inflated by the same amount. As such, the first update from node B had insufficient information for node A to learn that it should expect an update from node C in a short time.

In accordance with the present invention, if node B informs node A of the impending update from node C, node A will understand that the current candidate route from node C is only transient. This example illustrates a routing topology change that is visible to BGP through the path vector protocol. However, this visibility is not currently exploited by the standard BGP protocol procedures.

Referring back to FIG. 1, assume that instead of an increase in the cost of link BD to 5, the event that triggers route updates is the loss of BGP peering between node B and node D. This causes node B to withdraw its route to node D in the updates sent to node A and node C. Unlike a BGP route advertisement that contains route attributes such as the AS-PATH, the message to withdraw a prefix does not contain any other information. As such, the withdraw messages received by node A do not provide node A with any useful information about the change in routing topology. As far as node A is concerned, a route may have been withdrawn due to any of a variety of reasons such as a transit policy change at node B for link AB, the loss of peering between node B and node D, and the like. Unlike the previous scenario of link cost increase, this example of link loss illustrates a scenario where BGP routing topology change is not made sufficiently visible to the routers through the changes in path vectors known by a router.

Thus, the above example illustrates the lack of sufficient information in a path vector routing protocol. The concepts of the present invention provide a means for overcoming the shortcomings of the prior art routing protocols. For example, in accordance with the present invention, in the above scenario node B not only withdraws its previously advertised route to node D, but also informs its neighbors of the reason for the withdrawal (i.e., the loss of peering). As such, node A uses the information about the withdraw reason from node B to infer, for example, that the current candidate route via node C to node D has a path vector that includes the link BD and hence will also be withdrawn or updated soon. Consequently, node A could classify the current candidate route via node C as transient and avoid advertising it as the new preferred route to its neighbors. The new information facilitates the removal of unnecessary advertisements during convergence. In this sense, the reason information added to BGP route updates impacts the selection and timing of route update propagation.

As such, in accordance with the present invention if a Node, $N_1$, sends an update/withdraw to a Node, $N_2$, with a reason, r, Node $N_2$ can use the reason information, r, to infer that a route that $N_1$ previously advertised to $N_2$ is no longer preferable, at least in part due to reason r. In addition, by selectively advertising routes that are expected to be stable during a convergence period, the number of unnecessary updates during routing convergence is reduced and thereby convergence time is shortened. In the above illustration, Node $N_1$ and Node $N_2$ are an example of an AS-pair.

Figure 2:
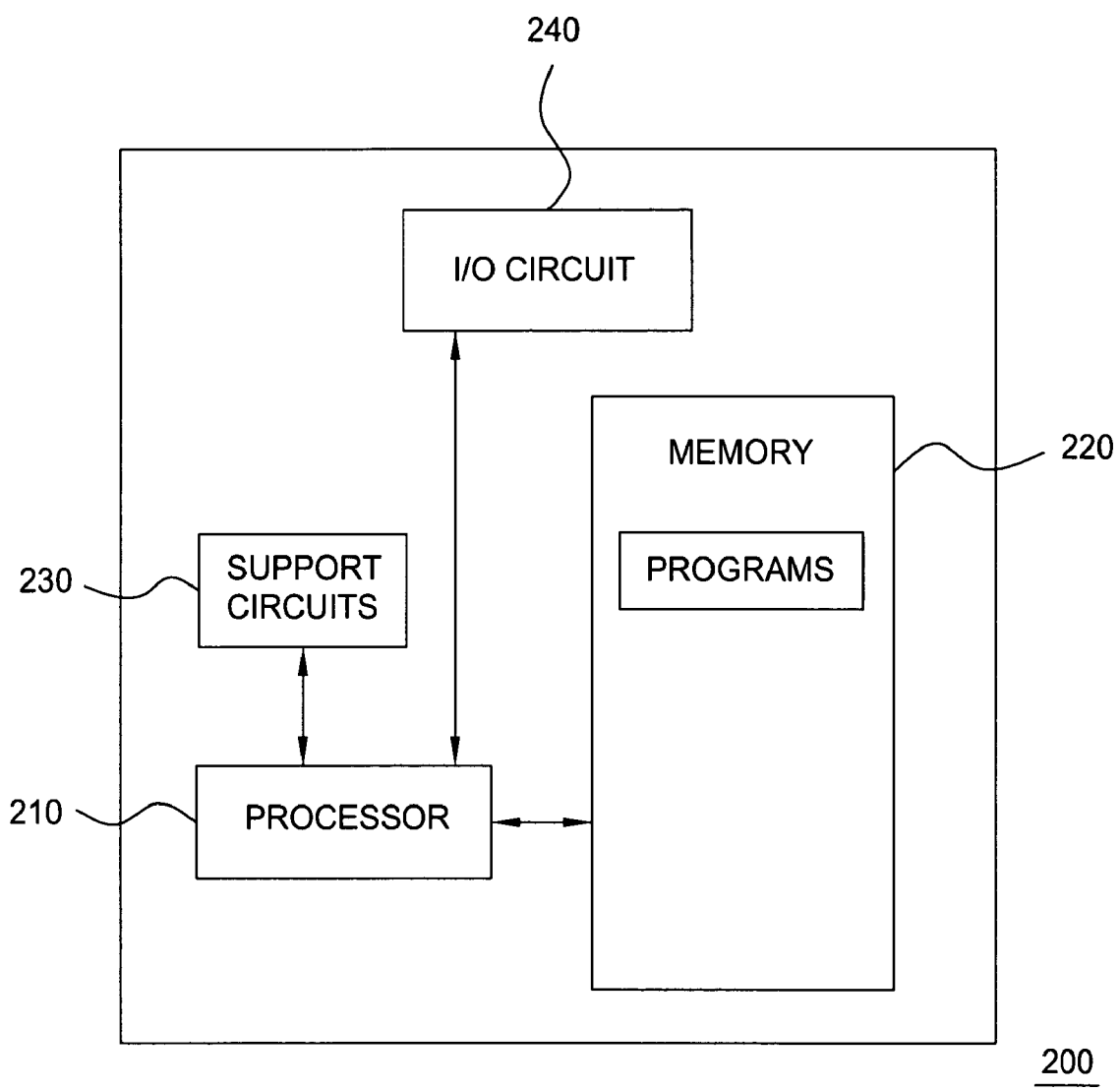
FIG. 2 depicts a high-level block diagram of an embodiment of a router suitable for use in an embodiment of the present invention.

FIG. 2 depicts a high level block diagram of an embodiment of a router 200 suitable for use in an embodiment of the present invention. The router 200 of FIG. 2 comprises a processor 210 as well as a memory 220 for storing control programs and the like. The processor 210 cooperates with conventional support circuitry 230 such as power supplies, clock circuits, cache memory and the like as well as circuits that assist in executing the software routines stored in the memory 220. As such, it is contemplated that some of the process steps discussed herein as software processes may be implemented within hardware, for example, as circuitry that cooperates with the processor 210 to perform various steps. The router 200 also contains input-output circuitry 240 that forms an interface between the various functional elements communicating with the router 200.

Although the router 200 of FIG. 2 is depicted as a general purpose computer that is programmed to perform various control functions in accordance with the present invention, the invention can be implemented in hardware, for example, as an application specified integrated circuit (ASIC). As such, the process steps described herein are intended to be broadly interpreted as being equivalently performed by software, hardware, or a combination thereof.

Accuracy of inferences about stability of candidate routes at a router are improved by increasing the amount of information about the routing topology that is made available at the router. However, the practical utility of any solution that requires carrying significantly more information in BGP about the routing topology is limited due to the associated costs. The potential benefits of reduced convergence time, lower number of updates and lesser disruption to users has to be traded off with the costs related to added protocol complexity, message overhead, processing overhead, implementation issues and deployment considerations. The objective is to add minimal new information to route updates and devise mechanisms for propagating and using such information during route selection to achieve convergence faster and with fewer messages.

The following is a set of primitive update triggering events that would necessitate an update:
- the origin AS of the prefix decides to withdraw the prefix
- some AS in the network decides to stop providing any transit for the prefix
- there is a policy change that amounts to restricting the use of a certain peering for transit to the prefix
- there is loss of peering that was providing transit for the prefix
- AS-PATH padding policies with respect to a link change so that the effective cost of a peering link in either (or both) directions changes.

For any of the above events, one AS will initiate an update. The router that initiates the update message tags it with a reason identifying the type of event that triggered the update and also identifies the AS-pair linked to the event. As this update causes cascading updates in the network, the reason code propagation rules are configured according to the following semantic:
- when node A sends a route update with a tagged reason to node B, it indicates to node B that the previously advertised route by node A is no longer preferred due to the tagged reason sent with the new route. When node A receives a reason, it examines the potential impact of the information contained on other candidate routes. The node then classifies its candidate routes into two categories:
  - Transient routes: those for which an update or a withdraw should soon be expected due to the same received reason,
  - or
  - Stable routes: those that are not affected by the received reason.

While the objective of this classification is primarily to reduce the propagation of transient routes, new route selection algorithms may be developed to exploit this classification. Furthermore, it is not restricted that routers must advertise only stable routes. But when a transient route is advertised, it is desirable that receiving routers learn that the sending node believes the advertised route to be transient.

Figure 3:
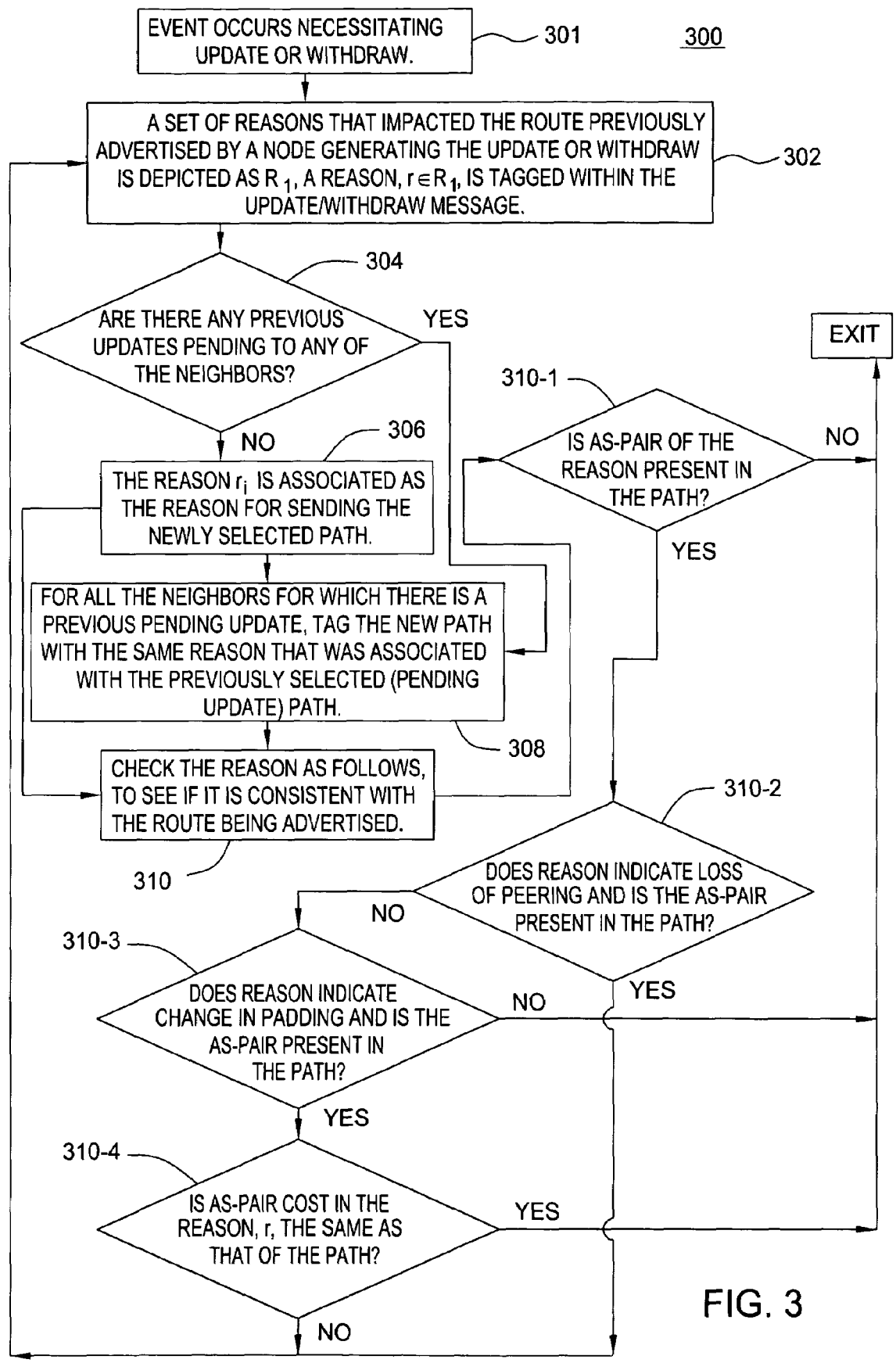
FIG. 3 depicts a flowchart of an embodiment of a method for reason propagation in accordance with the present invention.

FIG. 3 depicts a flowchart of an embodiment of a method for reason propagation in accordance with the present invention. The method 300 depicts an embodiment of Minimal Reason Propagation in accordance with the present invention. The method 300 is entered at step 301 where an event occurs necessitating an update or withdraw to be generated.

At step 302, a set of reasons that impacted the route previously advertised by the node, N, generating the update or withdraw is depicted as $R_1$. A reason, $r \epsilon R_1$, is tagged within the update/withdraw message. When multiple reasons exist, a reason, $r_i$, whose associated As-pair is closest to the node, N, on the previously advertised route is tagged. The method 300 then proceeds to step 304.

At step 304, the method 300 determines if there are any previous updates pending to any of the neighbors. If any previous pending updates exist, the method 300 skips to step 308. If no such updates exist, the method 300 proceeds to step 306.

At step 306, the reason $r_i$ is associated as the reason for sending the newly selected path. The method 300 then proceeds to step 310.

At step 308, for all the neighbors for which there is a previous pending update, the new path is tagged with the same reason that was associated with the previously selected (pending update) path. The method 300 then proceeds to step 310.

At step 310, because multiple reasons can occur and because reasons arriving on transient routes are ignored, to ensure the appropriateness of the reason associated with a route update, the reason is checked to see if it is consistent with the route being advertised. In accordance with the illustrated embodiment of the present invention, the reason is checked according to steps 310-1 through 310-4 of the method 300.

At step 310-1, the method 300 determines if the AS-pair of the reason is present in the path. If the AS-pair of the reason is not present in the path, there is no contradiction and the reason is appropriate. The method 300 is then exited. If the AS-pair of the reason is present in the path, the method 300 proceeds to step 310-2.

At step 310-2, the method 300 determines if the reason indicates loss of peering. If the reason indicates loss of peering, then clearly there is a contradiction. The method 300 then returns to step 302 and another reason, r, is tagged. If the reason does not indicates loss of peering, the method 300 proceeds to step 310-3.

At step 310-3, the method 300 determines if the reason indicates an increase or decrease in padding. If an increase or decrease in padding exists in the path, the method 300 proceeds to step 310-4. If an increase or decrease in padding exists does not exist in the path, the method 300 is exited.

At step 310-4, the method 300 determines if the AS-pair cost in the reason, r, is the same as that of the path. If the AS-pair cost in the reason, r, is the same as that of the path, the method 300 is exited. If the AS-pair cost in the reason, r, is not the same as that of the path, the method 300 returns to step 302 and another reason, r, is tagged.

In an alternate embodiment of the method 300, if a reason contradicts with the path being sent, the reason is dropped and the update is sent without any reason.

Figure 4:
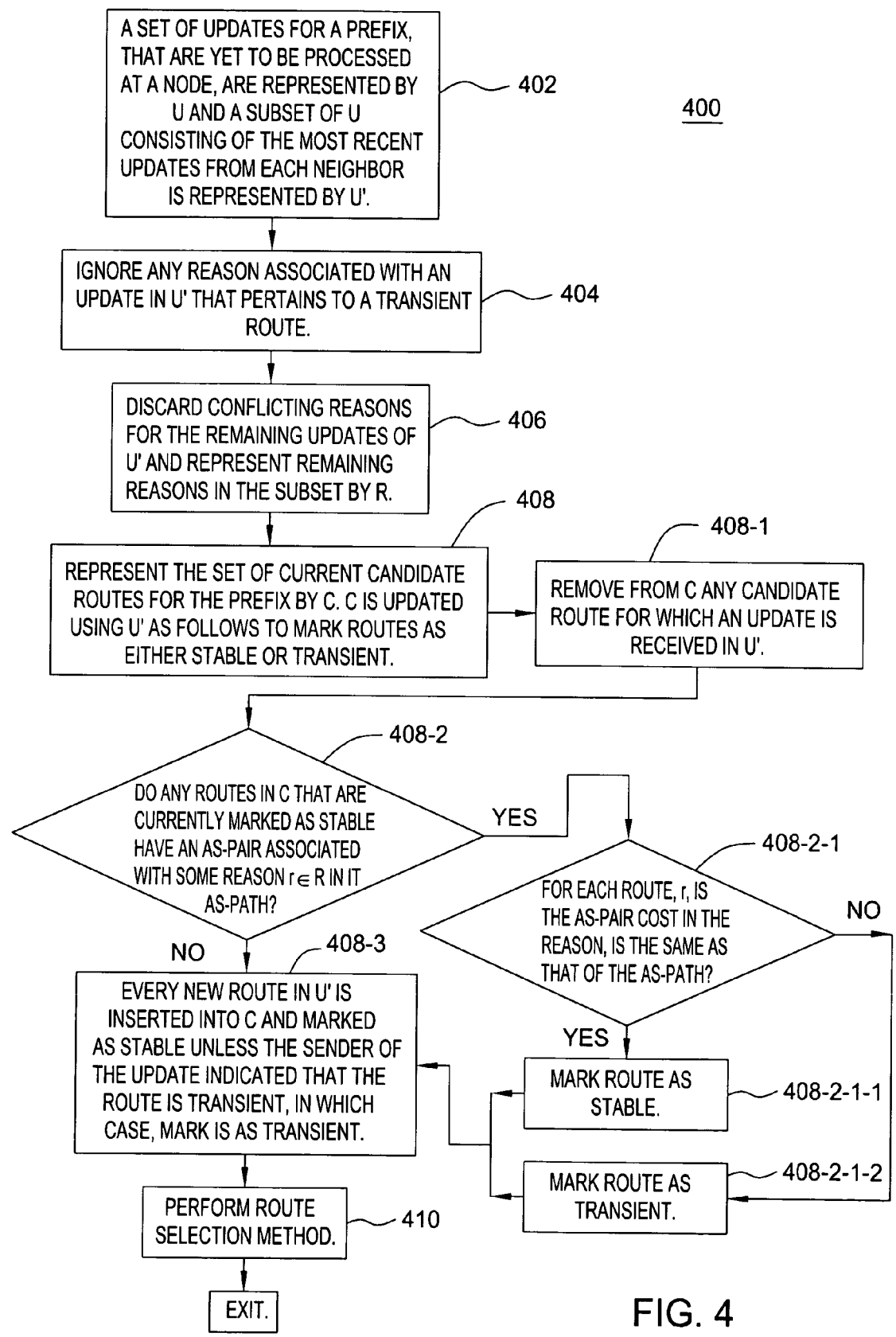
FIG. 4 depicts a flowchart of an embodiment of a method of processing propagated reasons in accordance with the present invention.

FIG. 4 depicts a flowchart of an embodiment of a method of route selection and the processing of propagated reasons in accordance with one embodiment of the present invention. The method 400 begins at step 402 where a set of updates for a prefix, that are yet to be processed at a node, are represented by U. A subset of U consisting of the most recent update from each neighbor is represented by U'. U' may differ from U because many implementations batch multiple updates before processing them. The method 400 then proceeds to step 404.

At step 404, the method 400 ignores any reason associated with an update in U' that pertains to a transient route. The rationale behind this action is that a reason pertaining to a transient route has probably been already processed before (when the route was marked as transient). The method 400 then proceeds to step 406.

At step 406, if there are two or more conflicting reasons for the remaining updates of U', the method 400 discards all such reasons, since such conflicts suggest that at least some of the information is older and, as such, it is better to ignore all of the information. The set of remaining reasons in the subset U' is represented by R. The method 400 then proceeds to step 408.

At step 408, a set of current candidate routes for the prefix is represented by C. C is updated using U' to mark routes as either stable or transient using the following steps 408-1 to 408-3:

At step 408-1, any candidate route for which an update is received in U' is removed from C.

At step 408-2, the method 400 determines if any routes in C that are currently marked as stable have an AS-pair associated with some reason r∈R in it AS-PATH. If any such routes exist, the method 400 proceeds to step 408-2-1. If no such routes exist, the method 400 proceeds to step 408-3.

At step 408-2-1, the method 400 determines for each route, if the cost of the AS-pair in the reason is the same as the cost in the AS-PATH. If the cost is the same, the method proceeds to step 408-2-1-1. If the cost is not the same, the method 400 proceeds to step 408-2-1-2.

At step 408-2-1-1, it is assumed that this reason has no impact on the status of the route and the route remains marked as stable. After all routes have been checked, the method 400 proceeds to step 408-3.

At step 408-2-1-2, the route is marked as transient because an update to reflect the change in link cost is expected. After all routes have been checked, the method 400 proceeds to step 408-3.

At step 408-3, every new route in U' is inserted into C and marked as stable unless the sender of the update indicated that the route is transient, in which case, mark it as transient. The method 400 then proceeds to step 410.

At step 410, the method 400 performs route selection. A conventional BGP route selection may be performed in this step in accordance with the present invention. Alternatively, a variation of the conventional BGP route selection, such as BGP route selection on the stable path set only (such variation will be discussed in detail below), may be performed in accordance with the present invention. The method 400 is then exited.

In an alternate embodiment of the present invention, considered by the inventors as AS-pair version propagation, for each AS-pair in a route's AS-PATH, AS-pair version information is also included. Furthermore, version information is added for the AS-pair carried in each reason. That is, when a node sends out an update, the AS-PATH of the new route contains the version for each AS-pair. In addition, the reason information contains a change in AS-pair from the route it had previously advertised and is now replacing. A node receiving such additional information would use the version information in marking its candidates routes as transient. That is, a route would be marked as transient only if the reason's version is greater than the version of the corresponding AS-pair in the AS-PATH of the route being marked.

As described above, a route is marked as transient because its AS-PATH contains at least one AS-pair that a reason, r, indicated has undergone a change, which should cause this path to be updated or withdrawn within a reasonable time. With this in mind, in alternate embodiments of the present invention, the risk of a route remaining erroneously in the transient set for too long is overcome by an inventive aging procedure. That is, an upper bound on the time a route remains in the transient set is determined, and a timer mechanism is used to un-mark a transient route if an update is not received within this upper bound time.

For example, let ABCDE be the AS-PATH and let DE be the AS-pair due to which the route associated with this AS-PATH is marked transient. If the reason is interpreted correctly, it implies that an update is on the way from D to A but has not yet reached A. Assuming now that there is an upper bound, say b seconds, on the amount of time that is needed for an update to pass through an AS, it is then appropriate to assume that from the time D initiated an update for the update triggering event on DE, A should receive an update in at most 3b seconds due to the fact that there are three (3) ASs between A and D. Based on the above, an enhanced minimal reason propagation mechanism where a timer is associated with a transient route and a route is re-characterized as stable if no update is received before the timer expires. The duration of the timer, in one embodiment, is calculated as discussed above as a function of the affected AS-pair on the route's AS-PATH and the expected AS transit time for an update. Such a timer enhancement may be viewed as adding a self-correcting feature to the Minimal Reason Propagation method described above, when for whatever reason (software bugs, route dampening, etc) a route is marked as transient for too long.

In an alternate embodiment of the present invention, conventional BGP route selection methods are modified to perform the route selection of the present invention. As previously described, the message may contain zero or more attribute-less withdrawn routes followed by at most one set of path attributes along with a set of one or more prefixes that share these path attributes (NLRI). In accordance with the present invention, additional information, such as an indication by a sender of the route whether the route is stable or transient at the sender and a reason code associated with the update/withdraw indicating a reason due to which the previously advertised route is no longer the preferred route, are added to the update message.

The first piece of added information (whether the route is stable or transient at the sender) is meaningful only for route updates, while the second piece of added information (a reason code associated with the update/withdraw indicating a reason due to which the previously advertised route is no longer the preferred route) is relevant for both withdraws and updates. The indication of whether an advertised route is stable or transient is performed through the use of the BGP community attribute without requiring any protocol change.

In one embodiment of the present invention, reason information is encoded as a triplet that contains the type of the update initiating event, the AS-pair where the update was initiated, and, if appropriate, the new cost for the AS-pair. For example, if an update is being initiated by AS2 due to a loss of peering with AS1, the reason could be (t1, AS1:AS2, infinity), where t1 is the type code associated with a loss of peering, 'AS1:AS2' is the AS-pair associated with the event initiation and 'infinity' is the new cost of transit service from AS2 to AS1 for the given prefix.

If instead of a loss of peering, the AS padding was increased to x, the type code would indicate 'increase in padding', the AS-pair would be the same and the cost would be set to x. If on the other hand, AS1 happens to generate a withdraw indicating that it will not provide access to the given prefix, the type code would be no service', the AS-pair is encoded as 'AS1:AS1.' and the cost would be irrelevant and therefore ignored. Tagging additional information to a new route in an update is relatively straightforward. The community attribute of BGP may be exploited or new optional transitive reason attribute may be defined whose format can be defined to incorporate the reason information. Associating additional information with withdraw messages is not as convenient according to the current BGP procedures since BGP withdraws are attributeless. As such, in one embodiment of the present invention, the current format is enhanced by changing BGP withdraws from an attribute-less list to a list of blocks of withdrawn prefixes where each block contains zero or more attributes and one or more withdrawn prefixes that share these attributes.

In alternate embodiments of the present invention, withdraws of prefixes are sent in substantially the same manner as updates using the notion of NLRIs described above. In such cases, the reason attributes as defined above are implemented. However, to adhere to the semantics of the BGP update message, it may be necessary to address the issue of well-known mandatory attributes. For example, the AS-PATH attribute could be set to OxF to indicate, by convention, that this update is really a withdraw.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. A method for improved inter-domain routing convergence, the method being performed at a first node, the method comprising:
   transmitting reason information from the first node toward a second node, wherein the reason information is associated with a route update or withdraw, wherein the reason information comprises a reason for the route update or withdraw, wherein the reason information is adapted for use by the second node to determine which candidate routes of the second node are affected by the event that triggered the received route update or withdraw and which candidate routes of the second node are not affected by the event that triggered the received route update or withdraw, wherein a candidate route is considered as a transient route if the reason information indicates that the candidate route is to be updated or withdrawn.

2. The method of claim 1, wherein the reason information comprises reasons selected from the group consisting of a loss of peering between nodes and a change in a cost of a link between nodes.

3. The method of claim 1, further comprising transmitting version information for the route update or withdraw.

4. The method of claim 3, wherein the version information comprises a version of the update or withdraw for each node pair and the change in node pairs from a route previously advertised.

5. The method of claim 3, wherein the version information is adapted for use by the second node to determine the stability of candidate routes of the second node.

6. The method of claim 5, wherein a candidate route is considered as a transient route if a version of a reason is greater than the version of a corresponding node pair in a path of the candidate route being considered.

7. A method for improved inter-domain routing convergence, comprising:
   transmitting reason information from a node toward at least one other node, wherein the reason information is associated with a route update or withdraw, wherein the reason information comprises a reason for the route update or withdraw, wherein the reason information is adapted to enable identification of candidate routes affected by an event that triggered the route update or withdraw, wherein the reason information is transmitted along with the route update or withdraw, wherein said reason information is encoded as a triplet within a route update or withdraw message, wherein the triplet comprises:
   a type code identifying the reason for the update or withdraw;
   an indication of a node pair associated with the update or withdraw; and
   an updated cost of a link between the node pair associated with the update or withdraw.

8. A method for improved inter-domain routing convergence, the method being performed at a node, the method comprising:
   receiving, at the node, reason information associated with a received route update or withdraw, wherein the reason information comprises a reason for the route update or withdraw; and
   using the received reason information to determine which candidate routes of the node are affected by the event that triggered the received route update or withdraw and which candidate routes of the node are not affected by the event that triggered the received route update or withdraw, wherein a candidate route is considered as a transient route if the node determines from the reason information that the candidate route is to be updated or withdrawn.

9. The method of claim 8, wherein the node avoids advertising a candidate route considered as a transient route as a preferred route to neighbors of the node.

10. The method of claim 8, wherein a route previously considered as transient is considered as stable if the route is not updated within a predetermined time period.

11. The method of claim 8, further comprising:
    receiving, at the node, version information associated with the received route update or withdraw, wherein the version information comprises a version of the update or withdraw for each node pair and the change in node pairs from a route previously advertised; and
    using the received reason information and the received version information to determine which candidate routes of the node are affected by the event that triggered the received route update or withdraw and which candidate routes of the node are not affected by the event that triggered the received route update or withdraw;
    wherein the node avoids advertising a candidate route considered as a transient route as a preferred route to neighbors of the node.

12. An apparatus for improved inter-domain routing convergence, comprising:
    means for identifying reason information associated with a route update or withdraw, wherein the reason information comprises a reason for the route update or withdraw, wherein the reason information is adapted to enable identification of candidate routes affected by an event that triggered the route update or withdraw; and
    means for transmitting the identified reason information toward at least one neighboring apparatus;
    means for receiving reason information associated with a received route update or withdraw; and
    means for using the received reason information to determine which candidate routes are affected by the event that triggered the received route update or withdraw and which candidate routes are not affected by the event that triggered the received route update or withdraw, wherein a candidate route is considered as a transient route if the apparatus determines from the received reason information that said the candidate route is to be updated or withdrawn.

13. The apparatus of claim 12, wherein the apparatus avoids advertising a candidate route considered as a transient route as a preferred route to neighbors.

14. The apparatus of claim 12, further comprising:
    means for identifying version information for a route update or withdraw; and
    means for transmitting the identified version information for the route update or withdraw.

15. The apparatus of claim 14, further comprising:
    means for receiving version information associated with a received route update or withdraw; and means for using the received version information to determine the stability of candidate routes.

16. The apparatus of claim 15, wherein a candidate route is considered as a transient route if the apparatus determines from the received version information that a version of a reason is greater than the version of a corresponding node pair in a path of the candidate route being considered.

17. The apparatus of claim 16, wherein the apparatus avoids advertising a candidate route considered as a transient route as a preferred route to neighbors.

18. A communications network having improved inter-domain routing convergence, comprising:
a plurality of network devices, each of the network devices comprising a processor and a memory, wherein the network devices perform the steps of:
transmitting reason information associated with a route update or withdraw to neighboring devices, wherein the reason information comprises a reason for the route update or withdraw;
receiving reason information associated with a received route update or withdraw; and
using the received reason information to determine which candidate routes are affected by the event that triggered the received route update or withdraw and which candidate routes are not affected by the event that triggered the received route update or withdraw, wherein a candidate route is considered as a transient route if a network device determines from the received reason information that the candidate route is to be updated or withdrawn.

19. The communications network of claim 18, wherein the network devices avoid advertising a candidate route considered as a transient route as a preferred route to neighbors.

20. A non-transitory computer readable medium storing a set of instructions which, when executed by a processor, cause the processor to perform a method for improved inter-domain routing convergence, the method comprising:
transmitting reason information associated with a route update or withdraw, wherein the reason information comprises a reason for the route update or withdraw, wherein the reason information is adapted for use by a node receiving the reason information to determine which candidate routes of the node are affected by the event that triggered the received route update or withdraw and which candidate routes of the node are not affected by the event that triggered the received route update or withdraw, wherein a candidate route is considered as a transient route if the reason information indicates that the candidate route is to be updated or withdrawn.

21. The non-transitory computer readable medium storing a set of instructions which, when executed by a processor, cause the processor to perform a method for improved inter-domain routing convergence, the method comprising:
receiving reason information associated with a received update or withdraw, wherein the reason information comprises a reason for the route update or withdraw; and
using said received reason information to determine which candidate routes are affected by the event that triggered the route update or withdraw and which candidate routes are not affected by the event that triggered the route update or withdraw, wherein a candidate route is considered as a transient route if the reason information indicates that the candidate route is to be updated or withdrawn.

22. The non-transitory computer readable medium of claim 21, wherein a candidate route is considered as a transient route if it is determined from the reason information that said the candidate route is to be updated or withdrawn.

23. The non-transitory computer readable medium of claim 22, wherein a candidate route considered as a transient route is avoided being advertised as a preferred route.

* * * * *